(No Model.) 3 Sheets—Sheet 1.

R. R. OSGOOD.
DREDGE DIPPER.

No. 254,563. Patented Mar. 7, 1882.

Attest:
John Buckler
F. W. Hanaford

Ralph R. Osgood,
Inventor.
By Worth Osgood,
Attorney.

N. PETERS. Photo-Lithographer, Washington, D. C.

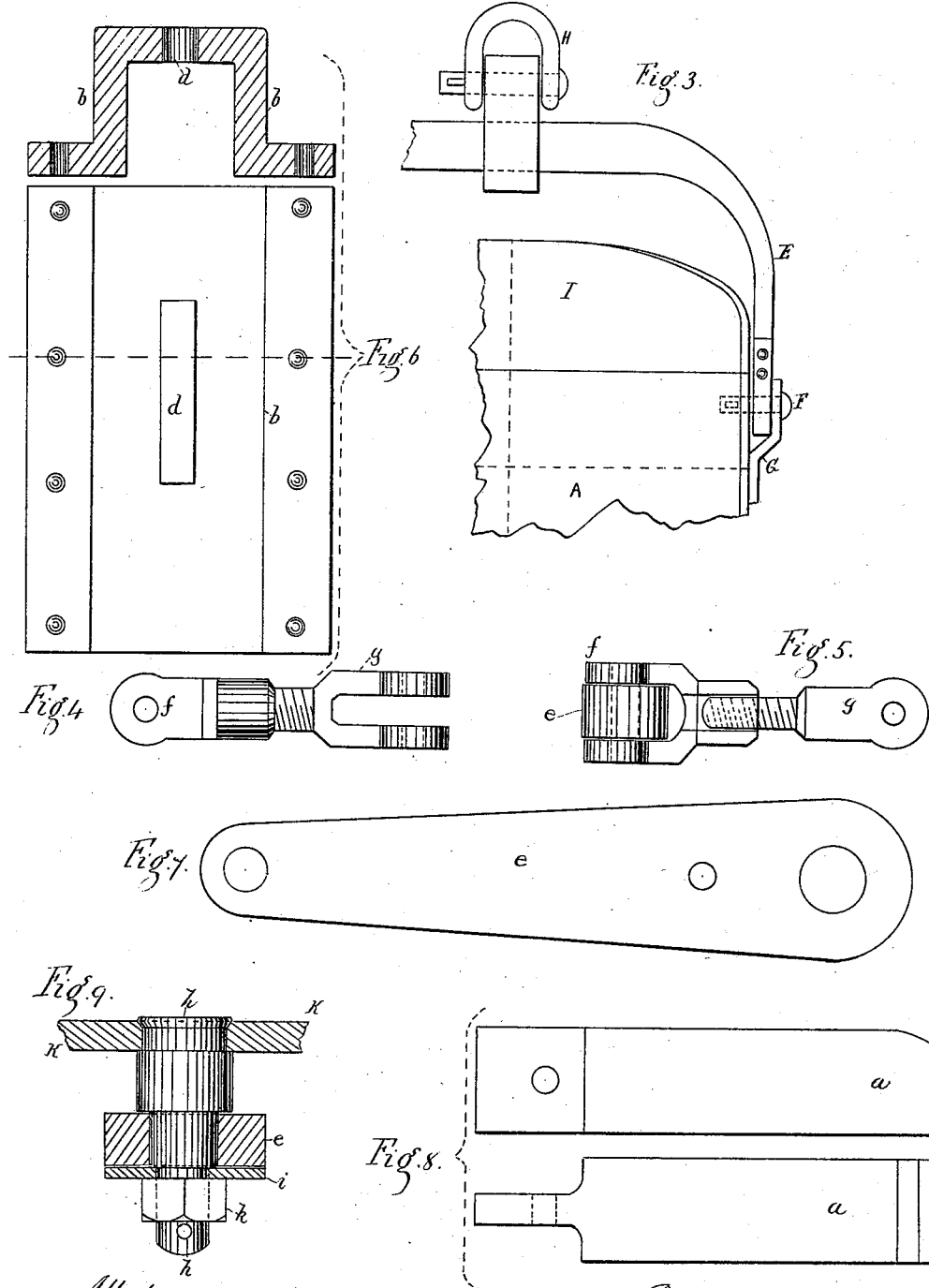

(No Model.) 3 Sheets—Sheet 3.
R. R. OSGOOD.
DREDGE DIPPER.
No. 254,563. Patented Mar. 7, 1882.
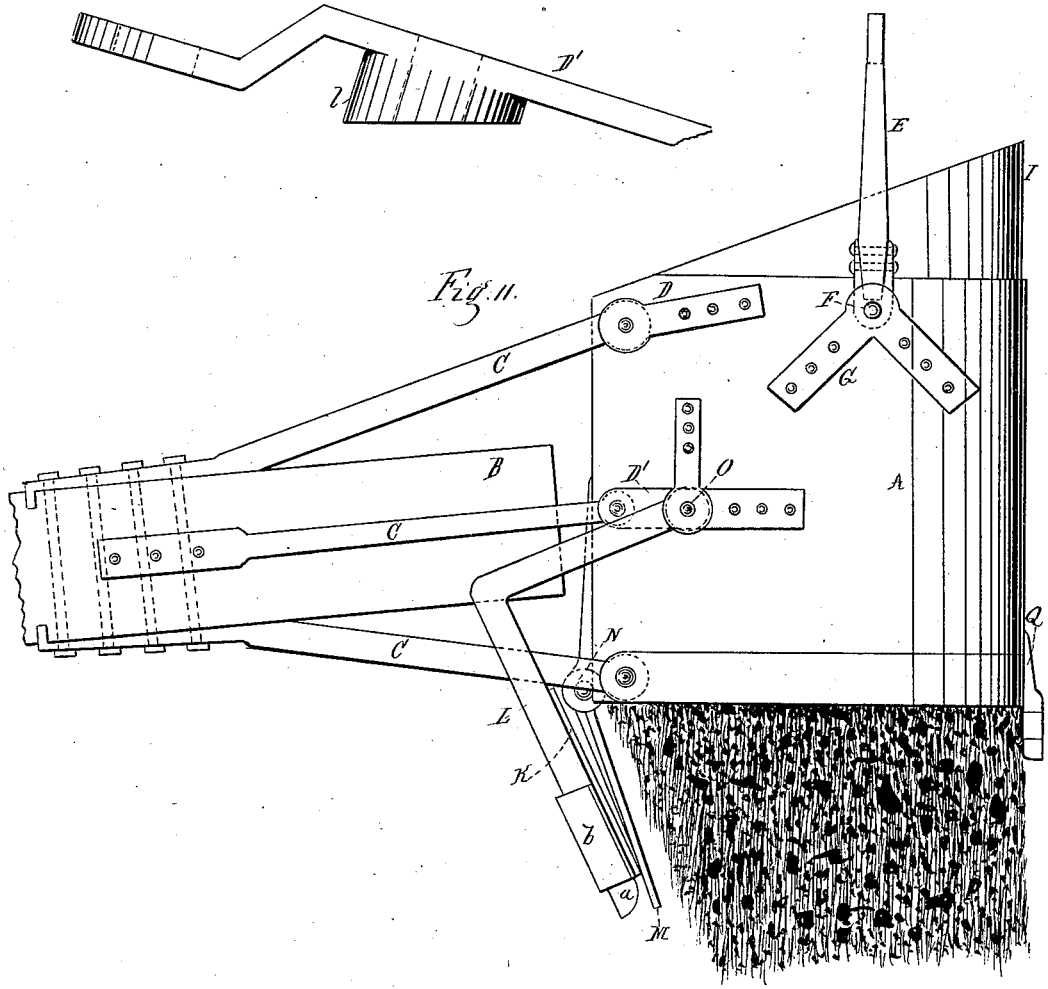

UNITED STATES PATENT OFFICE.

RALPH R. OSGOOD, OF TROY, ASSIGNOR TO OSGOOD & MacNAUGHTON, OF ALBANY, NEW YORK.

DREDGE-DIPPER.

SPECIFICATION forming part of Letters Patent No. 254,563, dated March 7, 1882.

Application filed December 12, 1881. (No model.)

*To all whom it may concern:*

Be it known that I, RALPH R. OSGOOD, of Troy, county of Rensselaer, and State of New York, have invented certain new and useful Improvements in Dredge-Dippers, of which the following is a full, clear, and exact description, reference being had to the accompanying drawings, and to the letters of reference marked thereon.

My invention has relation to dippers or scoops employed upon dredging machines or excavators for the purpose of gathering, elevating, and discharging the material, especially that class intended to be mounted upon a handle, and generally of large size and capacity.

The principal object of my invention is to improve the means and manner of dumping or discharging the aforesaid class of scoops or dippers, and secondary objects are to simplify and improve the connections and fittings or mountings of the attachments employed in and around the dipper for securing, moving, and operating the same; and the invention involves the application of a double door, or two-part door, at the bottom of the dipper, peculiarly hinged, and arranged to open within narrow limits beneath the dipper, so as to economize in room required for dumping, and certain novel and useful peculiarities of construction and arrangements or combinations of parts and fittings, all of which will be herein first fully described, and then pointed out in the claims.

Figure 1:
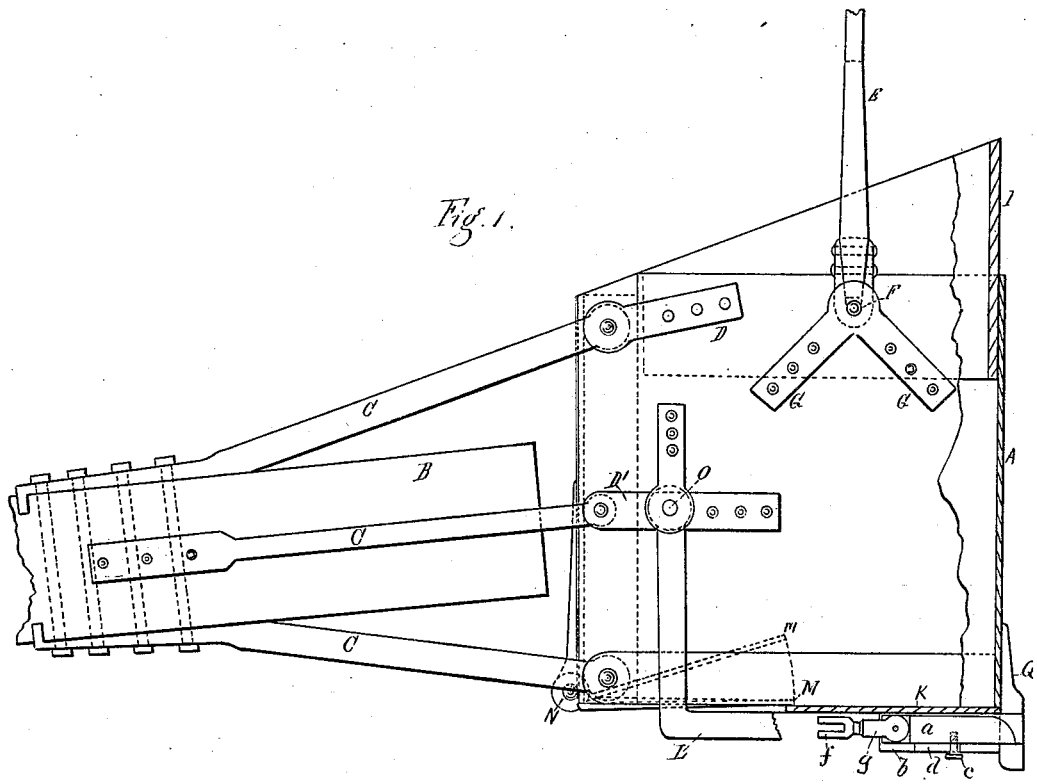
Figure 2:
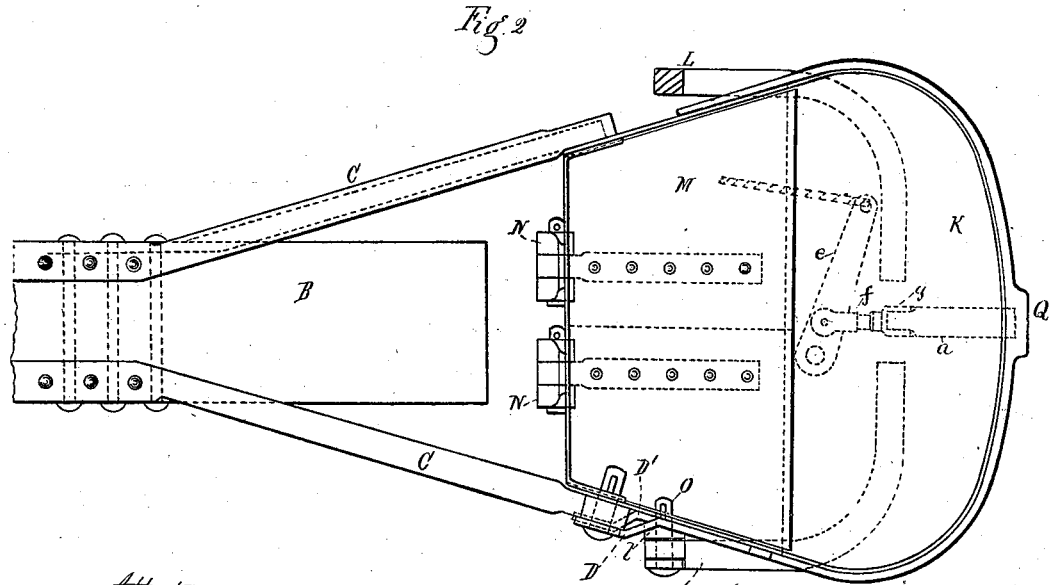

In the accompanying drawings, forming part part of this specification, Figure 1 is a side elevation and partial section of a dipper or scoop constructed and arranged to operate in accordance with my invention, the front wall and bottom being shown in section. Fig. 2 is a top or plan view of the improved dipper shown in Fig. 1, the bail-connections, the nose-piece, and the hinge-connections upon one side being omitted, the underlying parts or attachments being indicated by dotted lines. Fig. 3 is a front elevation of a fragment of the dipper, showing the means of connecting the dipper-bail therewith. Fig. 4 is a plan, and Fig. 5 a corresponding side elevation, showing the form and construction of the device employed for connecting the door-latch and its operating-lever. Fig. 6 represents a plan and section of the latch-casing; Fig. 7, a plan of the lever employed for moving the latch, and Fig. 8 a side elevation and plan of the latch disconnected from the other parts. Fig. 9 is a sectional elevation, showing an improved form of stud for hinging the latch-lever upon the dipper-door. Fig. 10 is a vertical view, showing the general form and manner of constructing and applying the seat for one of the hinges of the main door. Fig. 11 is a side elevation, indicating the location of the door when swung open upon my improved hinge-connections.

In all these figures like letters of reference, wherever they occur, indicate corresponding parts.

A is the shell of the dipper or scoop, made of any required size, and generally of boiler-iron or steel. Steel is preferred, because it affords the requisite strength with lighter weight of metal. The dipper is securely mounted upon a handle, B, of any length, which handle is usually supported by a boom or crane. The supports for the handle, forming no part of my present invention, have been omitted from the drawings, though it should be understood that they may be of any approved style or pattern.

For attaching the dipper to the handle in a secure and substantial manner, I prefer to employ bars or braces C C C, firmly bolted near the end of the handle and secured upon the shell by bolts or rivets which pass through eyes in the overlapping stay-pieces D D', the latter being also bolted or riveted to the shell and serving to distribute the strains upon the connections over a considerable extent of surface, thereby contributing to the strength of the union.

The bail E is hinged to the sides of the dipper, preferably upon eyebolts F, which are supported upon forked stay-pieces G, and upon the top of the bail is a clevis attachment, H, to which the hoisting-chain is to be applied. The dipper is elevated and drawn into the working-bank by the hoisting-chain thus connected with it.

A steel nose-piece, I, is mounted upon the shell, forming the cutting-edge of the dipper, and intended to withstand the wear, abrasion, and various other strains to which it is subjected when forced into the material to be dredged or excavated. These appliances, not being essential features of my invention, may be variously modified.

The dipper is of course open at top and takes its load there, the load afterward to be discharged or dumped through the bottom. In dumping the load it is apparent that the dipper must be elevated high enough to give a clear-swinging space for the bottom, which opens downwardly. If the door be hinged at the rear of the dipper, as has been heretofore the common practice, then the swinging-space required for it is at least equal to the length of the door from front to rear. This extra distance to which the dipper and its load is required to be elevated amounts to considerable in the course of a day's work, consuming time as well as power, and resulting in other disadvantages, especially in the matter of properly lodging the material. I greatly lessen the space required for swinging the dipper by my improved form of door and manner of hinging the same upon the dipper. The door is made in two parts. The main or front part, K, carrying the latch and the tripping mechanism below it, is supported upon the hinged arms L L, and the other part, M, is hinged to the back of the dipper by strong hinges N N. The arms L L extend under the main part of the door, as indicated in Fig. 2, a sufficient distance to afford a fair support therefor, and they are hinged to the dipper, as upon bolt O, at a point well removed from the bottom and likewise from the extreme rear of the dipper. The peculiar construction of the hinge will be referred to hereinafter. When the section K is latched, as indicated at Fig. 1, the front of section M laps over upon it, and the latter is thus supported at its front edge. The two sections form a complete bottom for the dipper. When the latch is tripped and the two-part door allowed to open, the extended hinge-arms L, by reason of their length, angular form, and the location of their hinge-connection with the dipper, carry the front section of the door back to a position, as indicated in Fig. 11, the front edge being comparatively close up under the bottom. In this position the rear section of the door simply drops down with the other section, leaving the dipper entirely open at bottom.

It should be observed that in Fig. 11 the opened door is represented as in a position to which it will be forced by the moving load, (it may be forced farther back,) and not where it would naturally hang upon the hinges; but the figure indicates that very little space is required for the swinging of the door below the bottom of the dipper. Both sections of the door swing toward the same side of the dipper. (Toward the back in the arrangement shown.) When the dipper is lowered into water, the door is automatically closed, same as ordinary dredge-dipper doors. The section M is allowed to swing inwardly upon its hinges during this closing movement, as indicated by dotted lines, Fig. 1, and this prevents the usual shock resulting from the sudden closing of the door, and is regarded as a valuable improvement.

The latch may be tripped by the usual means. The latch a is secured upon the under side of section K in a casing, b, and prevented from being withdrawn by a screw, c, movable in slot d. The rounded end of the latch enters the perforations provided for it in the band Q, mounted upon the bottom of the dipper-shell.

The latch-lever e is connected with the latch by means of the adjustable coupling, (most plainly shown in Figs. 4 and 5,) wherein the two sections f and g of the coupling may be adjusted in length by screwing one upon the other. The forked arms of part f embrace the lever e at a point not far from its pivotal connection with the door, and the part g is keyed to the latch a. By adjusting the coupling the play of the latch can be regulated within required limits. A rope or chain is employed to move the lever. The lever for controlling the latch is of any simple form. It is pivoted to the door by use of a stud, h, which is securely riveted in place and preferably made of steel. The construction of the stud is clearly shown in Fig. 9. A fair bearing for the lever is made by an enlarged portion of the stud, which maintains the lever at a proper location, and a washer, i, held in place by a removable nut, k, secures the lever upon its seat.

To prevent displacement of nut k, a key or jam-nut may be employed. This form of pivotal stud affords a firm mounting for the lever, and one not likely to be damaged or disarranged.

The band Q is shown as extending around the front and along both sides of the dipper. The enlarged piece in front for reception of the latch is preferably forged upon the band.

The arms L L are hinged upon opposite sides of the dipper, and the hinges N N are located upon the rear wall. The front of the dipper, as shown by the plan view, is wider than the rear, making the sides incline toward each other. The hinged arms L must bear against parallel faces of course, and they must be so mounted as to swing clear of any attachments upon the rear part of the dipper. I therefore provide the straps D' at the places of the hinges with projecting lugs l, perforated for the reception of the hinge-bolts, and cut upon their outer surfaces, so that when in place upon the dipper the inner surfaces of arms L will rest against them and be enabled to swing back and forth properly. The seat or bearing-surface for each arm thus formed is far enough removed from the walls of the dipper so that the swinging arms can freely pass other fittings upon the shell, as plainly shown by the plan view, Fig. 2.

The bolts used for hinges and those for securing the arms C C to the dipper are preferably made with keys, so that they may be easily removed. The side bars or braces afford an unyielding union between the dipper and its handle, and by hinging the arms which carry the door in the manner above explained they clear these sides braces entirely.

The detail views, Figs. 4, 5, and 10, show the parts enlarged beyond the dimensions indicated in Figs. 1, 2, and 11.

It is not essential that each feature of my improvements be employed upon one and the same dipper. Any of them or all of them may be used at pleasure. When constructed and arranged to operate upon the principles and in accordance with the explanations given above, the improvements answer all the purposes and objects of the invention as previously stated.

Having now fully described my invention, what I claim as new, and desire to secure by Letters Patent, is—

1. In a dipper of the character herein set forth, the door or bottom composed of two independently-hinged sections made to swing or open in the same direction, the hinges for the front section being located on opposite sides of the dipper, substantially as shown and described.

2. In a dipper of the character herein set forth, the door or bottom composed of two hinged sections, one supported in place by a suitable latch, the free end of the other supported upon the latched section, and the latched section hinged upon opposite sides of the dipper, substantially as shown and described.

3. In combination with a dipper of the character herein set forth, the two-part door or bottom, one section of which is arranged to swing inwardly as well as outwardly, and the other section hinged upon opposite walls of the dipper, substantially as and for the purposes set forth.

4. In combination with the dipper door or bottom, the latch, the operating-lever, and the adjustable coupling-bar uniting the two, substantially as shown and described.

5. In combination with the dipper having flaring side walls and side bars or braces for connecting it with the handle, the hinge-strap provided with raised seat and perforated for the reception of the bolt, the same being arranged substantially as shown, so as to allow the hinge-arms to swing outside of the side bars or braces, for the purposes set forth.

6. In combination with the dipper, the hinged door composed of two parts, one part hinged upon the rear of the dipper-shell and the other part hinged upon opposite sides of said shell at points removed from the bottom and back, substantially as shown and described.

In testimony that I claim the foregoing I have hereunto set my hand in the presence of two witnesses.

RALPH R. OSGOOD.

Witnesses:
WORTH OSGOOD,
F. W. HANAFORD.